United States Patent [19]

Bunting et al.

[11] Patent Number: 4,498,100
[45] Date of Patent: Feb. 5, 1985

[54] APPARATUS FOR FRAME-TO-FRAME COMB FILTERING COMPOSITE TV SIGNAL

[75] Inventors: Richard M. Bunting, Cranbury, N.J.; Alfonse Acampora, Staten Island, N.Y.

[73] Assignee: RCA Corporation, New York, N.Y.

[21] Appl. No.: 444,724

[22] Filed: Nov. 26, 1982

[51] Int. Cl.³ .............................................. H04N 9/535
[52] U.S. Cl. ......................................... 358/31; 358/36
[58] Field of Search ..................... 358/31, 36, 37, 166, 358/167

[56] References Cited

U.S. PATENT DOCUMENTS 4,232,330 11/1980 Heitmann ............................... 358/31
4,241,363 12/1980 Maeyama ............................... 358/31
4,296,436 10/1981 Achiha ................................ 358/167

FOREIGN PATENT DOCUMENTS 3007520 9/1981 Fed. Rep. of Germany .
2078054 12/1981 United Kingdom .

OTHER PUBLICATIONS

Pritchard, "ACCD Comb Filter for Color TV Receiver Picture Enhancement", RCA Review, vol. 41, Mar. 1980, pp. 3–28.
"A Motion-Adaptive System for Converting Color TV Signals into High Definition Signals", ITEJ, 7-2-80.

Primary Examiner—Michael A. Masinick
Attorney, Agent, or Firm—E. M. Whitacre; P. J. Rasmussen; E. P. Herrmann

[57] ABSTRACT

Frame-to-frame comb filter for separating chrominance and luminance components of composite video signals produce distortions around the periphery of reproduced moving images. The color distortions are corrected by selectively adding the combed luminance signal to the combed chrominance signal during periods of detected motion, and bandpass filtering the combined signal to pass only the chrominance spectrum.

8 Claims, 9 Drawing Figures

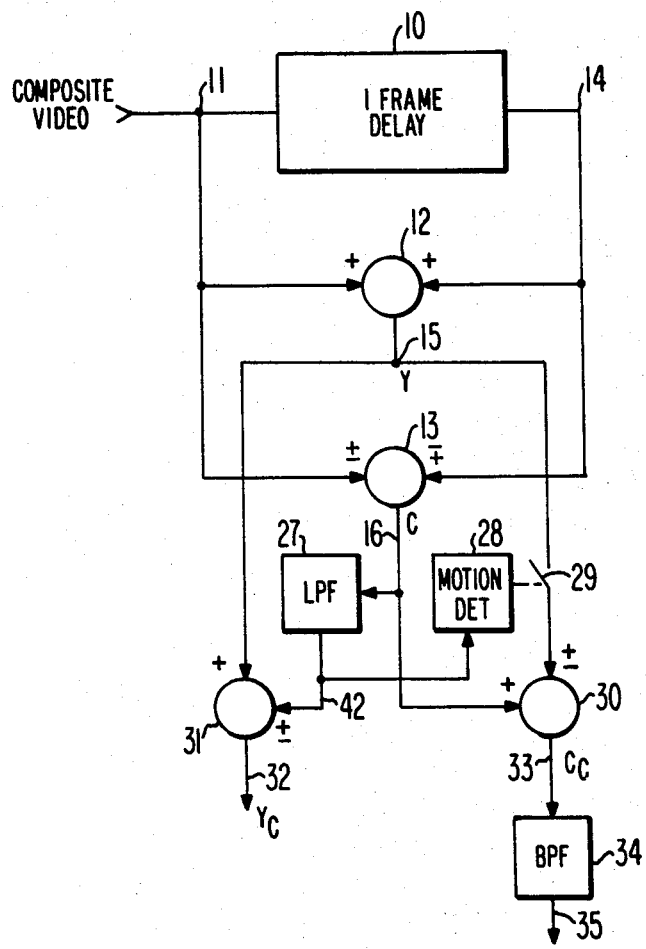
*Fig. 3a*
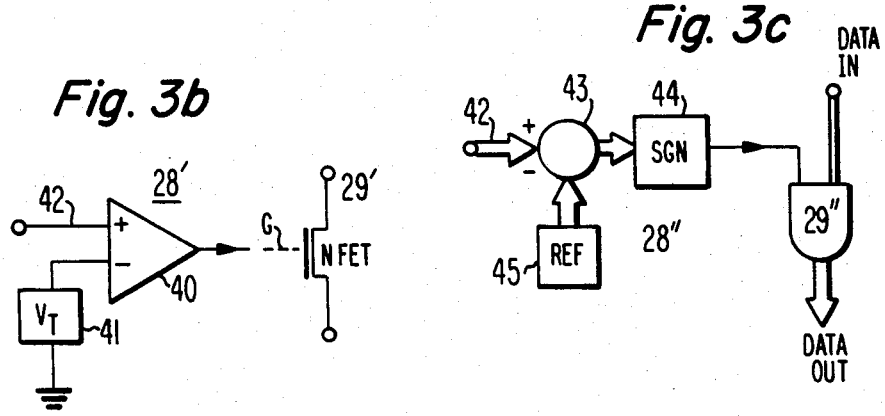
*Fig. 3b*
*Fig. 3c*

APPARATUS FOR FRAME-TO-FRAME COMB FILTERING COMPOSITE TV SIGNAL

BACKGROUND OF THE INVENTION

This invention relates to frame-to-frame comb filters for separating the luminance (Y) and chrominance (C) components of composite television signals and more particularly to means for correcting signal distortion due to the occurrence of motion between successive video frames in such a comb filter system.

Electronic signals which are periodic in nature may be processed advantageously by storing replicas of the signal which are separated in time by the repetition period and then combining the stored replicas to enhance information content of the signal. For example, conventional television broadcast systems (and most video record/playback systems) are arranged so that much of the brightness (luminance) information contained in an image is represented by signal frequencies which are concentrated about integral multiples of the horizontal line scanning frequency. Color (chrominance) information is encoded or inserted in a portion of the luminance signal spectrum around frequencies which lie halfway between the multiples of line scanning frequency (i.e., at odd multiples of one-half the line scanning frequency).

Chrominance and luminance information can be separated and detail information may be enhanced by appropriately combing the composite signal spectrum. Known combing arrangements take advantage of the fact that the odd multiple relationship between chrominance signal components and half the line scanning frequency causes the chrominance signal components for corresponding image areas on successive lines to be 180° out of phase with each other (so-called interlaced frequency components). Luminance signal components for corresponding image areas on successive lines are substantially in phase with each other (and comprise non-interlaced components).

In a comb filter system, one or more replicas of the composite image-representative signal are produced which are time delayed from each other by at least one line scanning interval (a so-called 1-H delay). The signals from one line are added to signals from a preceding line, resulting in the cancellation of the interlaced frequency components (e.g., chrominance) while reinforcing the non-interlaced frequency components (e.g., luminance). By subtracting the signals for two successive lines (e.g., by inverting the signals for one line and then adding the two), the non-interlaced frequency components are cancelled while the interlaced frequency components are reinforced. Thus, the luminance and chrominance signals may be mutually combed and thereby may be separated advantageously.

The foregoing combing process is possible because of the inherent high level of signal redundancy line-to-line in a typical video scene. If one considers a stationary picture, and a particular pixel of that scene, it will be appreciated that the level of redundancy of the signal representing that pixel on a frame-to-frame basis will be substantially one hundred percent. Thus, if combing were performed on a frame-to-frame basis, the percentage of residual luminance (chrominance) signal in the combed chrominance (luminance) signal will be significantly reduced over a line-to-line combed signal. More particularly, there will be, for example, no vertical detail accompanying the combed chrominance signal. By design, the chrominance signal of an NTSC composite signal is synchronized to have a 180 degree phase relationship from frame to frame permitting comb filtering on a frame basis. The luminance component may therefore be extracted by linear addition of the composite signal from successive frames and the chrominance component may be extracted by linear subtraction of the composite signal from successive frames. The response characteristic of a line-to-line comb filter has nulls or teeth spaced at line frequency or 15.734 KHz intervals while the frame-to-frame filter response has teeth at 30 Hz intervals. The closer teeth or null spacing of the frame comb gives rise to a more complete combing process than the interline comb.

In the frame-to-frame combing process, non-stationary objects give rise to distortions in the reproduced images. These distortions are due to incomplete cancellation of the luminance and chrominance components in the combed chrominance and combed luminance signals respectively (cross components) as well as an effective bandwidth reduction of the luminance signal in the regions of motion. Differences in scene content due to object motion or panning, that occur in the time frame of one-thirtieth of a second or faster are characterized as being visual motion of the scene content. The motion induced distortions created by the frame-to-frame combing process are two dimensional and are due entirely to interframe scene motion. The distortions are observable in both the horizontal and vertical directions in the plane of the image and are manifested as dual or phantom images in the reproduced scenes. The dual images are separated by an amount corresponding to the rate of motion and may be accompanied by incorrect hue at the edges of the moving objects.

In contrast, interline comb filters create one dimensional distortions which are due to vertical structure within a scene even if stationary. Distortions attendant the interline combing process are manifested as an effective lowering of the bandwidth of the signal representing vertical scene structure and a softening of vertical edges of the scene content.

It is an object of the present invention to reduce the objectionable effects produced by motion in a frame-to-frame combing system.

BRIEF SUMMARY OF THE INVENTION

The present invention is a frame-to-frame comb filter including a delay element for storing successive frames of composite video signal. A linear summing circuit having first and second input terminals coupled to receive current video signal and video signal delayed by one frame time produces a combed luminance component of the composite video signal. A linear subtracting circuit having first and second input terminals coupled to receive current video signal and video signal delayed by one frame time produces a combed chrominance component of the composite video signal. A linear phase low pass filter is serially connected with the linear subtracting circuit to substantially reject signals occupying the chrominance signal frequency spectrum and to pass residual luminance signal included in the combed chrominance signal. A second summing circuit having first and second input terminals coupled to receive the combed luminance component and the signal processed by the low pass filter produces a luminance signal substantially free of artifacts resulting from scene motion between frames of the video signal. A third summing circuit has a first input terminal coupled to receive the combed chrominance component from the subtracting circuit and a second input terminal to which the combed luminance component from the first summing circuit is selectively coupled. A threshold detector having an input terminal coupled to the output connection of the low pass filter controls the selective coupling of the luminance component to the third summing circuit responsive to motion induced residual luminance signal in the combed chrominance signal. The third summing circuit adds the frame-to-frame chrominance signal differences contained in the combed luminance component to the combed chrominance signal to substantially reduce frame-to-frame motion induced artifacts in the chrominance signal.

A linear phase bandpass filter is serially coupled to the output terminal of the third summing circuit. The bandpass filter has a frequency response designed to pass the frequency spectrum occupied by the chrominance spectrum and thereby produces a combed chrominance signal substantially free of luminance signal components.

BRIEF DESCRIPTION OF THE DRAWINGS

FIGS. 3a, 3b, and 3c are block diagrams of a frame-to-frame comb filter embodying the present invention.

DETAILED DESCRIPTION OF THE INVENTION

Figure 1:
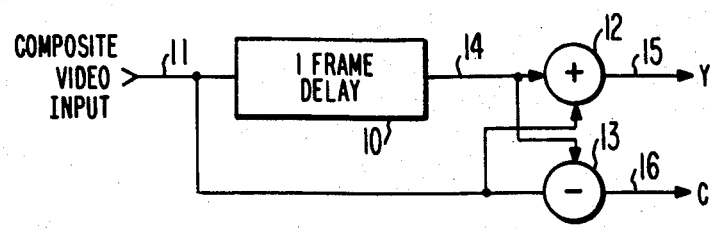
FIG. 1 is a block diagram of a frame-to-frame comb filter known in the art of TV signal processing.

Referring to FIG. 1, there is shown a frame-to-frame comb filter. For purposes of illustration, the apparatus will be described in terms of separating luminance and chrominance signals from a composite TV signal, however, the apparatus is not limited to this particular application. For example, the apparatus of FIG. 1 may be used to comb filter luminance signal for insertion of chrominance signal therein in the formation of a composite video signal.

In FIG. 1, a storage element 10 having the capacity to store the electrical manifestation of one frame (e.g., two fields of NTSC video format) of video signal, sequentially accepts signal from connection 11 and outputs the same signal onto connection 14 delayed by the duration of one frame period. The element 10 may comprise a digital memory, e.g., a random access memory (RAM) with the appropriate support electronics or an analog memory, e.g., a serial charge transfer device (CTD) such as a CCD with its necessary supporting circuitry. Conceptually it does not matter whether element 10 is a digital or analog circuit, however, it will be assumed that it is digital in nature. The remaining circuit elements incorporated therewith will therefore be considered to be digital in nature to obviate digital-to-analog signal conversion between the circuit elements.

Input signal from connection 11 and delayed signal from connection 14 are summed together in the ADDER circuit 12. The luminance components of signal being in phase add while the chrominance components being 180 degrees out of phase cancel to produce a substantially chrominance free luminance signal Y at connection 15. Input signal and delayed signal are also applied to the SUBTRACTOR circuit 13 wherein the chrominance components of the two frames sum constructively while the luminance components cancel to produce a substantially luminance free chrominance signal on connection 16 (at least when successive frame signals are records of the same stationary scene).

Figure 2:
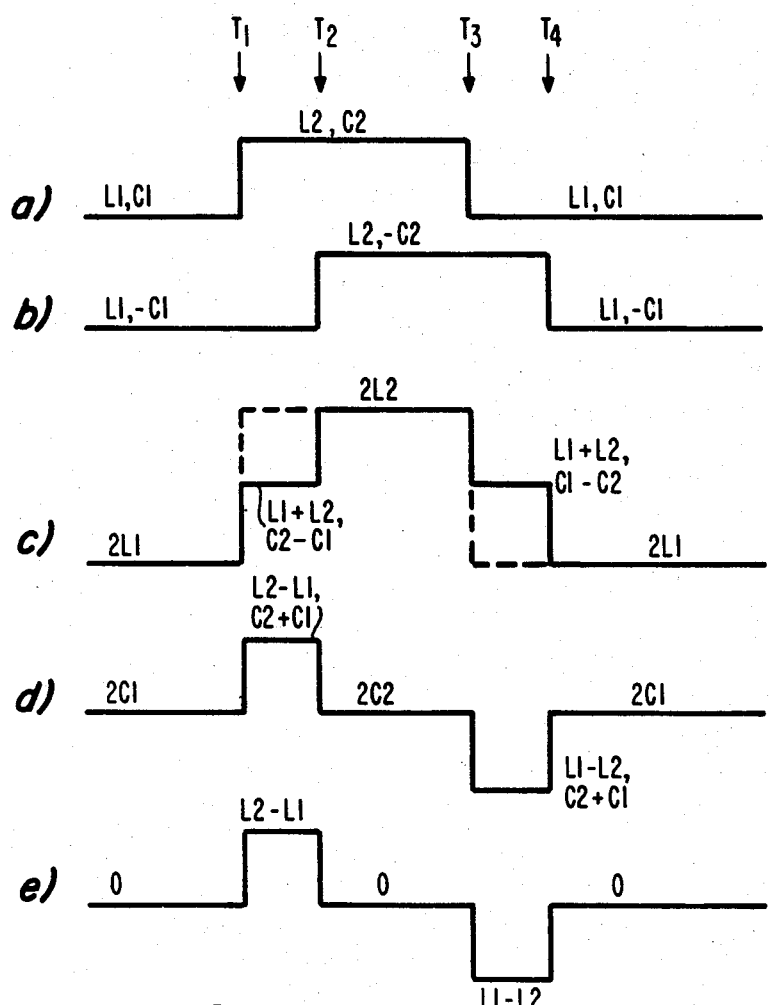
FIGS. 2a–e are amplitude versus time waveforms associated with the FIG. 1 circuit.

Referring to FIG. 2, the effects of motion on the aforedescribed frame-to-frame combing process is graphically illustrated. FIG. 2a represents a portion of the composite signal at an arbitrary time interval. FIG. 2b represents the composite video signal from the same scene exactly one frame period later in time and wherein some motion has occurred in the scene. In waveform 2a, assume that the signal component between times T1 and T3 represents an object having luminance and chrominance signal parameters L2 and C2 respectively and is located in an area of uniform scene content having luminance and chrominance signal parameters L1 and C1 respectively. Between frames, the object moves spatially causing the video signal representation of the object to translate temporally, i.e., to fall between times T2 and T4 in FIG. 2b. The relative signal parameters L and C of the luminance and chrominance components of signal remains the same between the FIG. 2a and 2b waveforms though there exists a time shift with respect to the object represented by L2, C2. The chrominance component of the signal, however, has a 180 degree phase relationship between waveforms 2a and 2b (i.e., between frames). The sum and difference of the FIG. 2a and 2b waveforms are represented by the waveforms 2c and 2d respectively. It is seen that for those segments of time in which the absolute value of the chrominance vector component between the 2a and 2b waveforms is the same, substantially complete cancellation of the chrominance component results from summing the two waveforms (FIG. 2c). Similarly, where the amplitude of the luminance component of the signal is the same between the two waveforms (2a and 2b) substantially complete cancellation of the luminance component results from a subtraction of the two waveforms FIG. 2d. FIGS. 2a, 2b, 2c and 2d are representative of signals occurring respectively at connections 11, 14, 15 and 16 of the FIG. 1 circuit.

Over the period where motion occurs between frames, i.e., between times T1 and T2 and times T3 and T4, unequal signals are being differentially summed, and incomplete cancellation of the undesired component occurs.

In addition, motion distorts the desired signal. The motion causes an averaging of the signal over the periods where motion occurs. These averages are represented in FIG. 2c by the signal segments denoted (L1+L2) which is equivalent to (2L1+2L2)/2. Normally the signal from the two frames will be weighted by a factor of ½ before being combined. The amplitude of the combed signal will be ½ the values shown and the signal during the motion period will be (L1+L2)/2. The averages (L1+L2) in the luminance signal tend to replicate the signal transitions to produce a double or phantom image which circumscribes the moving object. The averages (C1+C2) in the combed chrominance signal during periods of interframe motion tends to distort the hue around the moving object.

Low pass filtering the combed chrominance signal of FIG. 2d produces the signal shown in FIG. 2e. In FIG. 2e, the chrominance signal spectrum has been removed, leaving only the uncancelled luminance component resulting from the interframe motion. If the signal of FIG. 2e is added or subtracted to the signal of FIG. 2c, the edges of the luminance signal will be restored, producing a luminance component equivalent to one which has not been combed. Addition of the FIG. 2e signal will restore the luminance signal of FIG. 2c between the times T1 to T2 to the level of 2L2 and reduce the luminance signal between times T3 and T4 to the value of 2L1 as indicated by the broken lines.

The circuitry shown in FIG. 3a is a frame-to-frame comb filter with facility for correcting artifacts such as double images or smearing due to interframe motion. In FIG. 3, elements designated with the same numerals as elements in FIG. 1 perform identical functions. Thus, at the connections 15 and 16 of the FIG. 3a circuit, combed luminance and chrominance signals are respectively produced, which signals contain cross components as well as imperfectly combed signal components due to interframe motion.

The combed chrominance signal at connection 16 is applied to a linear phase low pass filter 27 to remove the chrominance signal spectrum leaving the uncancelled low frequency luminance components. The low pass filtered signal from filter 27 is added back to the combed luminance signal from connection 15 in ADDER circuit 31 to produce corrected luminance $Y_c$ at connection 32. The residual uncancelled chrominance component in the combed luminance signal from connection 15 tends only to create a second order distortion which is not observable except on close inspection of the displayed image.

The low pass filter 27 must be linear phase in order to properly reinsert the motion detail into the combed luminance signal. If the motion detail is not properly reinserted, due to phase differentials between the motion affected segments of the combed luminance signal and the motion detail extracted from the combed chrominance signal, transient response will be adversely affected.

While the residual chrominance (C2−C1, C1−C2) in the luminance channel due to interframe motion does not produce significant artifacts in the reproduced image, the averaged or transitional chrominance signal (C1+C2) in the combed chrominance signal component, occurring during motion periods, may produce particularly objectionable color distortions. Remembering that the chrominance signal is a vector quantity, the vector sum C2+C1 during motion periods may produce colors completely different from those represented by either of the signals C1 or C2. Thus, to retain color purity at the edges of moving objects, the chrominance component must be corrected for motion induced errors generated in the comb filtering process.

The information necessary for correcting the combed chrominance signal resides in the combed luminance signal and may be reinserted in a manner similar to the method for restoring the motion detail to the combed luminance signal. However, the chrominance restoration should not be a continuous process, but should only be performed during motion sequences. The reason for this is the relatively large energy density of the luminance signal compared to the cross components of the chrominance signal. Continuous addition of the combed luminance signal to the combed chrominance signal would effectively defeat the combing process. However, the addition of the combed luminance signal to the combed chrominance signal during periods of motion produces a preferable signal to no chrominance reinsertion. Since it is normally necessary to bandpass filter the combed chrominance signal to eliminate the residual luminance signal, i.e., luminance motion detail, the combed luminance component added to the combed chrominance is substantially eliminated from the corrected chrominance signal. Only the luminance components residing in the spectral band of the chrominance signal remain in the corrected chrominance signal and the energy of the luminance signal in this band is relatively low.

The luminance signal is comprised of constituents of the chrominance signal, i.e., red, blue and green signals, and therefore the amplitude of the luminance signal is indicative of the amplitude of the chrominance signal. The occurrence of signal, in excess of a predetermined value, emanating from low pass filter 27 indicates the occurrence of motion and the amplitude of this signal is indicative of the amplitude of the chrominance errors. Chrominance signal errors large enough to cause objectionable artifacts in the reproduced image can therefore be detected by measuring the amplitude of the luminance signal passed by the low pass filter 27.

In FIG. 3a a motion detector 28 coupled to the output connection of low pass filter 27 compares the low pass filtered combed chrominance signal against a threshold value. The threshold value is set at a level corresponding to a signal level which has been established to cause objectionable chrominance artifacts. When the low pass filtered signal from filter 27 exceeds the threshold value, the motion detector 28 generates a control signal which closes the switch 29.

FIGS. 3b and 3c are illustrative examples of analog signal and digital signal motion detectors respectively. The analog version 28' comprises a high gain differential amplifier 40 and a source of reference potential 41. Signal from filter 27 is applied to a non-inverting input terminal 42 of amplifier 40 and signal from reference source 41 is applied to the inverting terminal of amplifier 40. When the potential at terminal 42 exceeds the reference, the output signal from amplifier 40 goes high otherwise it remains low. Coupled to the output terminal of amplifier 40 is an N-type field-effect transistor 29' which may be implemented in place of switch 29 of FIG. 3a. A high potential applied to the gate (G) of the transistor closes the switch and a low potential opens the switch.

The digital version of FIG. 3c comprises a binary reference source 45, a subtraction circuit 43 (comparator), a sign detector 44 and an AND circuit switch 29". (In the drawing double line interconnections connote parallel bit lines.) Subtraotor 43 subtracts the reference number (45) from binary signal at the output 42 of filter 27. The difference value is examined by a sign circuit 44 to determine if it is positive or negative. If the difference is positive, the SGN circuit produces a positive output pulse which enables AND circuit 29" to pass the signal on its data lines. Note, if the subtractor performs twos complement arithmetic, the sign circuit may be eliminated and replaced with an inverter circuit directly connected between the most significant bit, i.e., the sign bit, of the subtractor output connections and the AND circuit. The FIG. 3B and 3C circuits as shown are only responsive to input signals of one polarity, however, it is well known in the circuit arts to parallel two such circuits to be responsive to both polarity signals. Alternatively, the comparator may be of the "window comparator" type.

Switch 29 selectively couples the combed luminance signal from connection 15 to one input of ADDER circuit 30. A second input of ADDER circuit 30 is directly coupled to receive the combed chrominance signal from connection 16. When motion detail exceeding the threshold value is detected, switch 29 is closed and the combed chrominance and luminance components are added in the ADDER circuit 30. When no motion detail is detected, switch 29 remains open and the combed chrominance signal from connection 16 is passed unaltered by the ADDER circuit.

The output signal from ADDER circuit 30 is coupled to a linear phase bandpass filter 34 which passes only the chrominance signal frequency spectrum.

Circuit elements 31 and 30 may be either ADDER or SUBTRACTOR circuits as indicated by the (±) signs at their input terminals in FIG. 3A. However, they must both be the same type circuit, that is both ADDERS or both SUBTRACTORS. Whether they are ADDERS or SUBTRACTORS determines whether the leading trailing motion distorted signal segments are restored or cancelled respectively.

What is claimed is:

1. A frame-to-frame comb filter for separating chrominance and luminance signal components from a composite video signal to produce comb filtered chrominance and luminance components, improved to correct the combed chrominance component during periods of interframe scene motion; wherein the improvement comprises:
    means for detecting interframe scene motion and generating a control signal responsive thereto;
    means responsive to said control signal, said comb filtered chrominance component and said combed filtered luminance component for combining the comb filtered luminance component with the comb filtered chrominance component during motion periods; and
    means for filtering the combined signal to pass only the chrominance frequency spectrum and produce a motion corrected chrominance signal.

2. An improved frame-to-frame comb filter for separating luminance and chrominance signal components from a composite video signal, wherein the improvement comprises:
    first means responsive to the separated combed chrominance signal component for detecting the occurrence of interframe scene motion and generating a control signal responsive to such motion;
    signal combining means having a first input terminal coupled to receive said combed chrominance component, having a second input terminal and an output terminal;
    second means responsive to said control signal for selectively coupling the separated combed luminance signal component to the second input terminal of the signal combining means when interframe scene motion is detected.

3. The comb filter set forth in claim 2 further including a linear phase bandpass filter serially coupled to the output terminal of said signal combining means, said bandpass filter being designed to pass only the chrominance signal frequency spectrum.

4. The comb filter set forth in claim 2 wherein said first means comprises:
    a low pass filter responsive to said combed chrominance signal and designed to reject the chrominance signal frequency spectrum;
    a reference;
    means for comparing signal passed by said low pass filter against said reference and generating said control signal whenever the low pass filtered signal differs from said reference by a predetermined amount.

5. The comb filter set forth in claim 4 wherein the second means is a switch.

6. The comb filter set forth in claim 2 wherein the signal combining means is a signal adding circuit.

7. The comb filter set forth in claim 2 wherein the signal combining means is a signal subtracting circuit.

8. An improved frame-to-frame comb filter of the type for separating interleaved video signal components and including delay means for delaying said video signal by at least one image period, first signal combining means for linearly adding the delayed and non-delayed video signal and thereby to separate a first of said interleaved signal components and second signal combining means for producing the difference between the video signal and the delayed video signal and thereby separating a second of said interleaved signal components, each of said separated first and second interleaved components containing cross components in the presence of interimage scene motion; wherein the improvement comprises means for inserting residual elements of the second of said interleaved components contained in the output signal produced by said first signal combining means into the second interleaved signal component produced by said second signal combining means including:
    a linear phase low pass filter having an input connection for applying signal from said second combining means and having an output terminal, said linear phase filter having a transfer function which substantially rejects the frequency spectrum occupied by said second interleaved component,
    first means coupled to the output terminal of said linear phase filter for generating a control signal responsive to signal from the filter;
    second means for combining two signals having a first input terminal coupled to said second signal combining means, having a second input terminal and an output terminal;
    third means responsive to said control signal for selectively coupling said second means second input terminal to said first signal combining means; and
    a linear phase bandpass filter serially coupled to said second means output terminal, said bandpass filter being designed to pass only the frequency spectrum occupied by said second interleaved component.

* * * * *